US006609765B2

(12) United States Patent
Radke et al.

(10) Patent No.: US 6,609,765 B2
(45) Date of Patent: Aug. 26, 2003

(54) ADJUSTABLE WHEEL AND AXLE ASSEMBLY FOR A WORK VEHICLE

(75) Inventors: Gregory Dean Radke, Waterloo, IA (US); Dennis Aaron Bowman, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/824,372

(22) Filed: Jun. 26, 2001

(65) Prior Publication Data

US 2003/0020324 A1 Jan. 30, 2003

(51) Int. Cl.[7] .............................................. B60B 37/00
(52) U.S. Cl. ................ 301/128; 301/111.03; 403/374.4
(58) Field of Search ............................... 301/1, 111.01, 301/111.03, 111.04, 128; 403/370, 371, 374.1, 374.2, 374.3, 374.4

(56) References Cited

U.S. PATENT DOCUMENTS 2,676,849 A 4/1954 Houck et al. .................. 301/1
3,847,493 A * 11/1974 Peter et al. ................. 403/370
4,317,596 A 3/1982 Lemmon ....................... 301/1
4,936,634 A 6/1990 Stratton et al. ............. 301/128
5,005,913 A 4/1991 Kittle et al. ................ 301/128
5,145,277 A * 9/1992 Fujita ...................... 403/374.4
5,174,680 A * 12/1992 Nakamura et al. .......... 403/370
5,639,176 A * 6/1997 Mullenberg ............. 403/374.4

* cited by examiner

*Primary Examiner*—Russell D. Stormer

(57) ABSTRACT

An adjustable wheel and axle assembly has a two piece inner element with inner and outer tapered portions. A wheel hub having a two-tiered tapered interior bore with one tapered portion engaging the inner element while the other tapered portion is radially space outward. A split ring wedge fits between the inner element and the wheel hub and is drawn in by a plurality of bolts extending through the wheel hub to clamp the inner element onto the axle. The taper angle is in the range of 14–16 degrees so that the parts are self releasing. A pinion gear with an integral shaft extending outward is used to move the wheel along the axle for adjusting the wheel position.

7 Claims, 4 Drawing Sheets

ADJUSTABLE WHEEL AND AXLE ASSEMBLY FOR A WORK VEHICLE

FIELD OF THE INVENTION

The present invention relates to an adjustable wheel and axle assembly for a work vehicle such as an agricultural tractor and in particular to a wheel and axle assembly that enables the wheel position to be infinitely adjusted along the length of the axle.

BACKGROUND OF THE INVENTION

Adjustable wheel and axle assemblies are known as shown in FIG. 1. The assembly of FIG. 1 is disclosed in U.S. Pat. No. 4,936,634. There an axle shaft 12 carries the adjustable wheel assembly 14. The wheel assembly 14 includes an outer wheel hub 18 having a tapered bore 24 large enough to accommodate the axle shaft 12 and provide an annular tapered bore in which upper and lower tapered flanged sleeves 26 and 28, respectively, can be received in a wedging action within the tapered bore 24. The upper tapered flanged sleeve 26 has a radially extending, semi-circular flange 30 and a semi-conical, axially extending portion 32. The lower tapered flanged sleeve 28 is of the same configuration as the upper sleeve 26, having a radially extending, semi-circular flange 34 and a semi-conical, axially extending portion 36.

The wheel hub is provided with a plurality of angularly spaced threaded bolt holes 46 that receive a matching quantity of bolts 48*a*, 48*b*, 48*c* and 48*d*. The semicircular flanges 30, 34 are provided with a plurality of similar angularly spaced bolt holes 50, that align with the threaded bolt holes 46 contained in the wheel hub 22. Also provided in the flanges 30, 34 are additional threaded bolt holes 52 spaced radially the same as the holes 50, but in a different angular relationship to the holes 50. When the bolts 48*a–d* are threaded into the holes 46 in the wheel hub, the conical portions 32, 36 of the tapered flanged sleeves 26, 28 are drawn tightly into the tapered bore 24 where the sleeves tightly engage the axle 12 to mount the wheel hub 18 to the axle 12.

The taper angle of the bore 24 and conical portions 32, 36 is not enough to be self releasing. In order to withdraw the conical portion 32, 36 from the bore 24, it is necessary to loosen the bolts 48. Bolts 48*b* and 48*c* are removed completely from the bores 50 and are threaded into the bores 52 until they abut against the face 56 of the wheel hub 18. With the aid of an additional torque producing tool, the bolts 48*b* and 48*c* are sequentially tightened, thus forcing the upper and lower sleeves 26, 28 to separate from the tapered bore 24. The total clamping force available to mount the wheel and axle assembly is limited by the number of bolts 48 used to draw the sleeves into the bore 24. As the power output of agricultural tractors increases, the wheel clamp load on the axle must also increase to avoid slippage between the axle and the wheel hub.

SUMMARY OF THE INVENTION

The present invention provides an improved adjustable wheel and axle assembly that produces a greater clamping force on the axle. This is accomplished by providing the tapered surfaces with a larger taper angle such that the parts are self releasing. This eliminates the need for the separate threaded bores 52 shown in FIG. 1 in the flanges 30, 34. Without the threaded bores 52, space is available in the flanges and hub for additional bolt bores to draw the tapered portions into engagement, thus enabling the clamp load on the axle to be increased.

The adjustable wheel and axle assembly of the present invention has an inner element with a radially outer, double tapered portion having a large center portion and axially inner and outer tapered portions extending axially inward and axially outward from the center portion. The wheel hub has a two-tiered tapered interior bore with a small diameter first tapered portion and a large diameter second tapered portion. The first tapered portion complements and fits onto one of the tapered portions of the inner element while the large diameter second tapered portion is spaced radially outward from the other tapered portion of the inner element. A split ring wedge having radially inner and outer tapered portions fits between the inner element and the large diameter tapered portion of the wheel hub. A plurality of bolts extending through the wheel hub and into the split ring wedge draw the split ring wedge into the wheel hub whereby the inner element is clamped onto the axle. The taper angle is in the range of 14–16 degrees such that the parts are self releasing. This eliminates the need for additional threaded bolt bores in the wheel hub for separating the components and allows for more bolts for generating the clamping force. In addition, the large taper angle enables the axial thickness of the adjustable wheel and axle assembly to be reduced as compared to the assembly shown in FIG. 1.

DESCRIPTION OF THE PREFERRED EMBODIMENT

Figure 2:
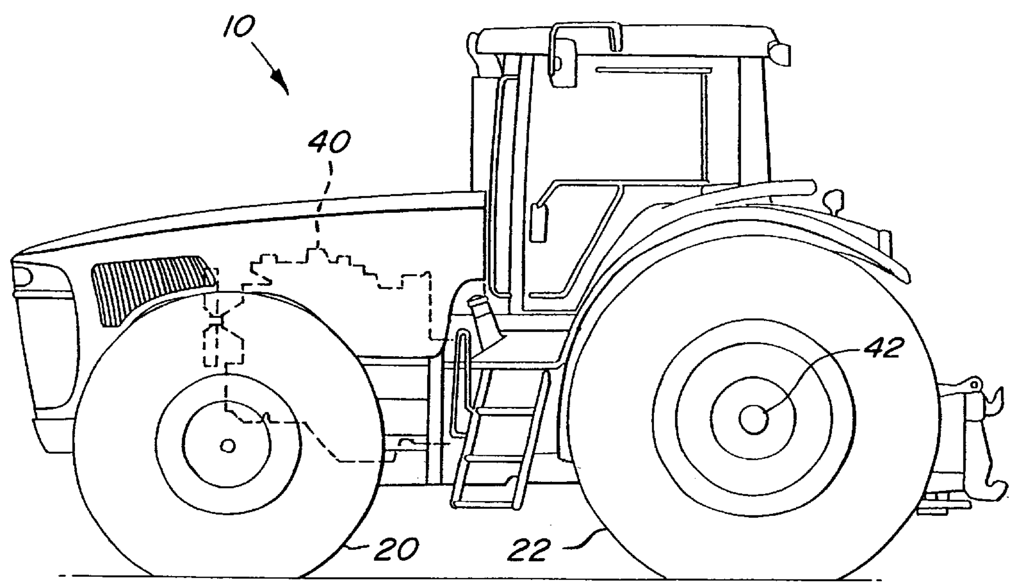
FIG. 2 is a side view of an agricultural tractor having the adjustable wheel and axle assembly of the present invention.
Figure 3:
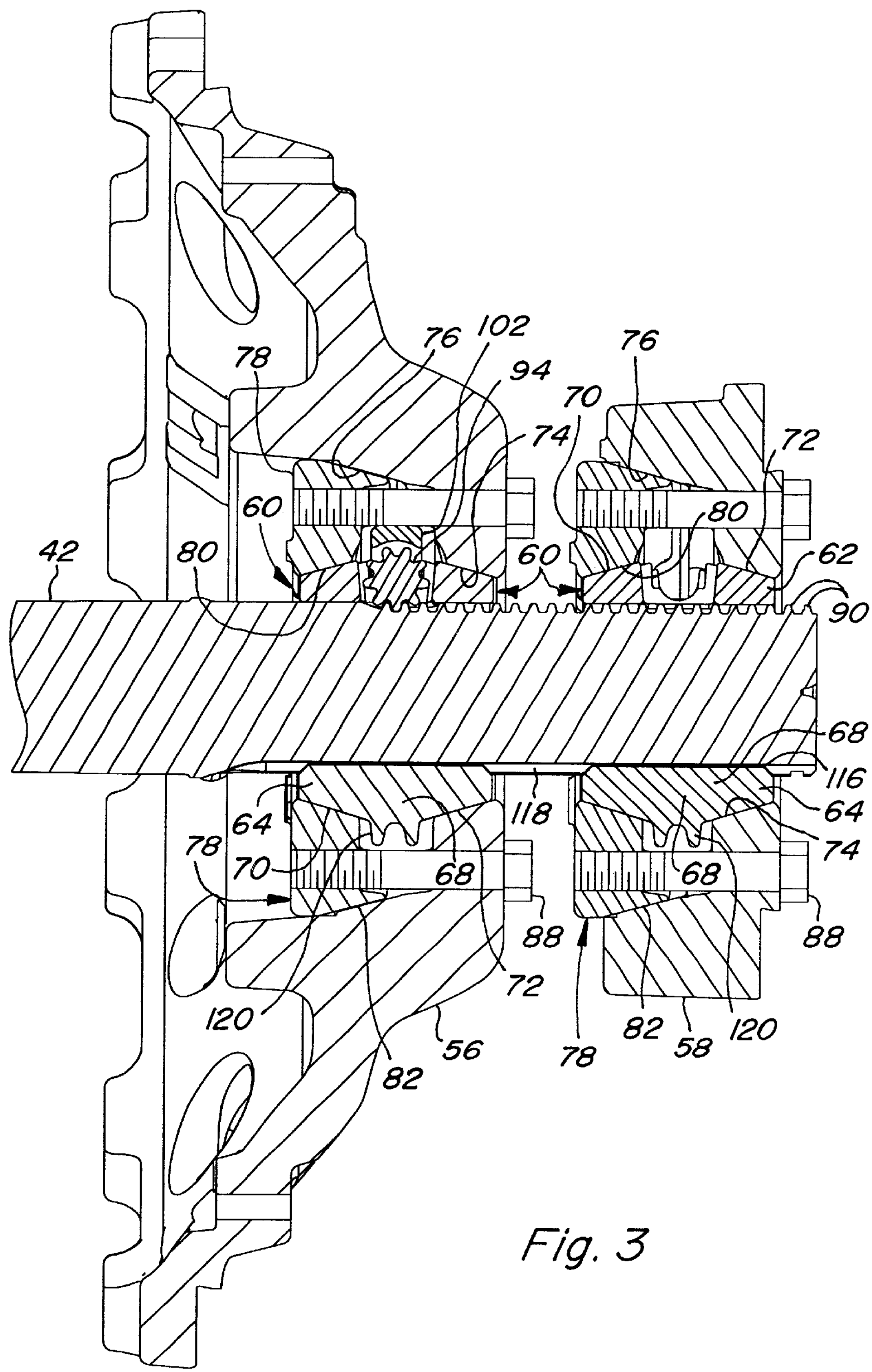
FIG. 3 is an axial sectional view of the adjustable wheel and axle assembly of the present invention showing dual wheels mounted to an axle.
Figure 4:
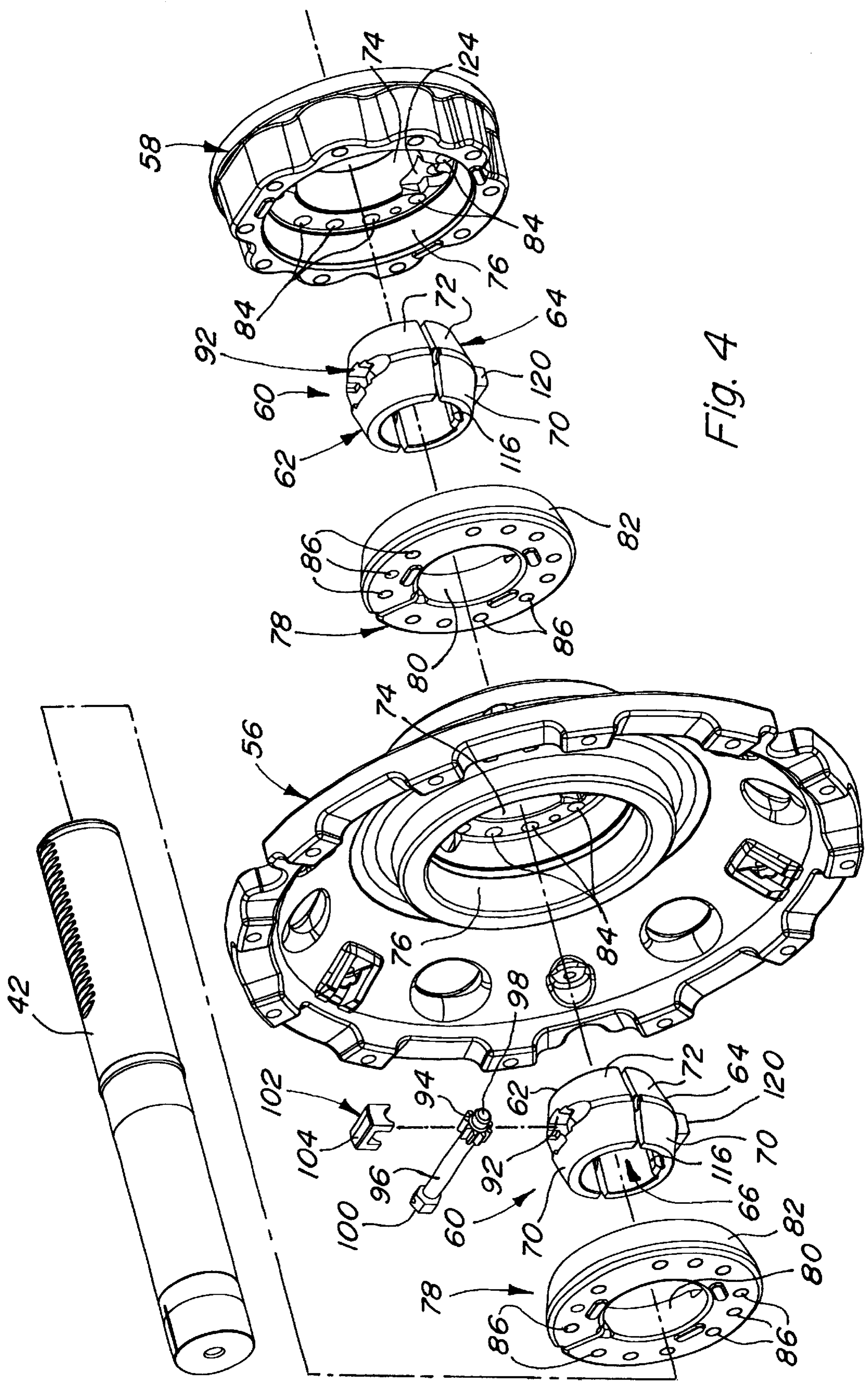
FIG. 4 is an exploded perspective view of the adjustable wheel and axle assembly of FIG. 3.
Figure 5:
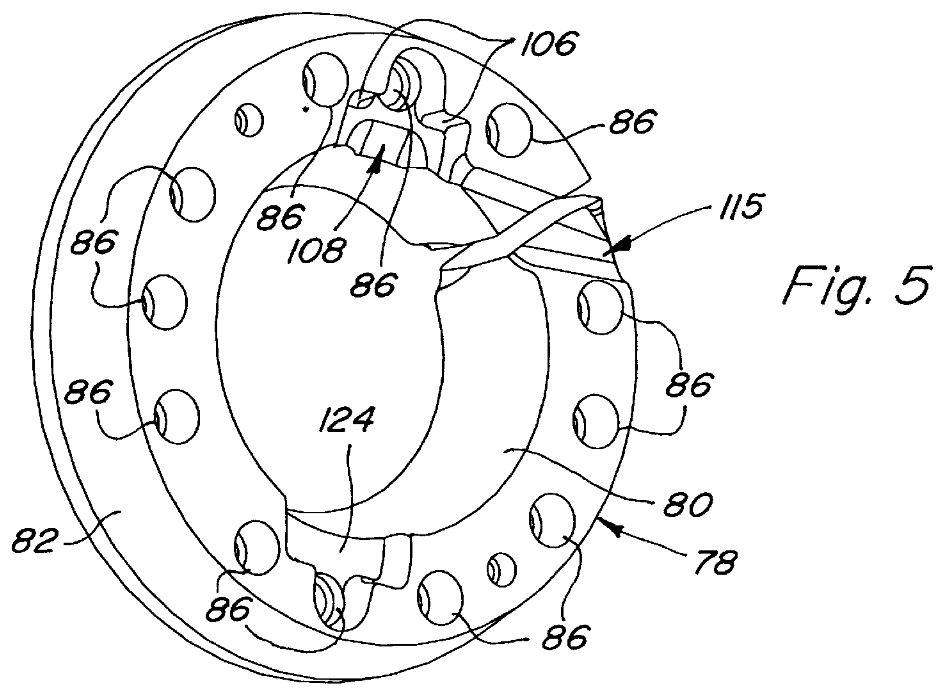
FIG. 5 is a perspective view of the split ring wedge.
Figure 6:
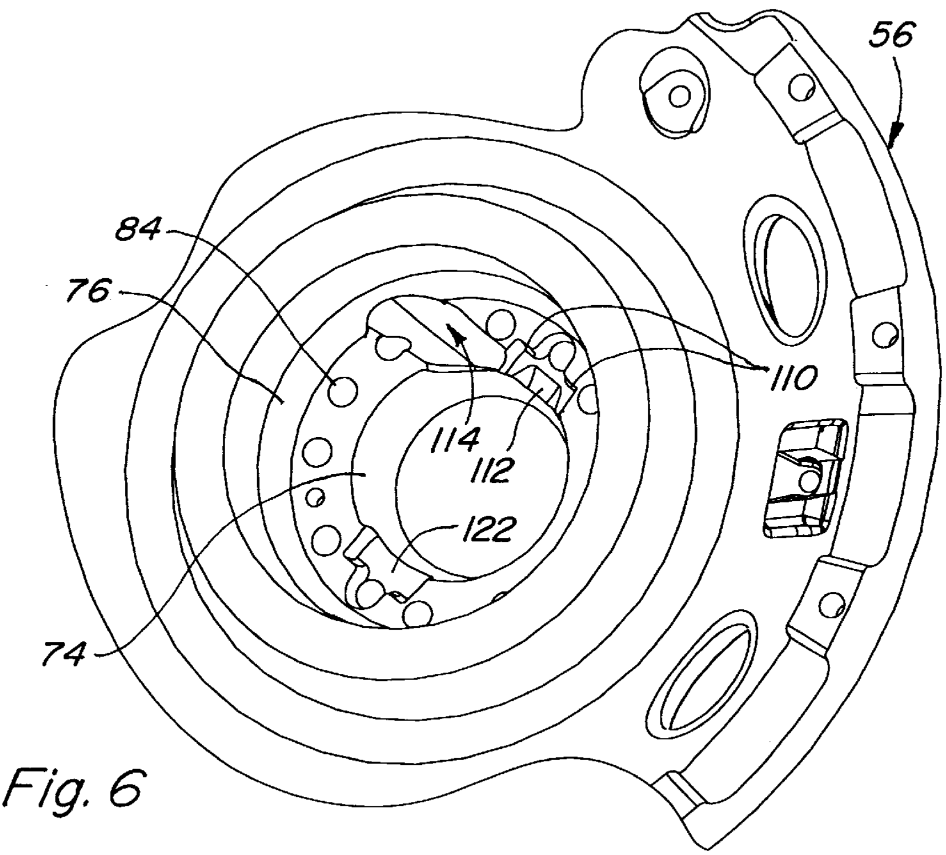
FIG. 6 is a perspective view of the center portion of the wheel hub illustrating the two-tiered tapered interior bore.

With reference to FIG. 2, an agricultural tractor 10 is shown which has front and rear wheels 20, 22 respectively. The tractor includes an engine 40 that drives both the front and rear wheel 20, 22. The rear wheels are mounted to a driven axle 42. With reference to FIGS. 3–6, the adjustable wheel and axle assembly is shown in greater detail. Dual rear wheels are mounted onto the axle 42. Each of the wheels include an inner wheel hub 5 and an outer wheel hub 58. While the inner wheel hub 56 is larger in diameter than he outer wheel hub 58, the portion of the wheel hub related to the adjustable wheel and axle assembly of this invention are common between the two hubs. Wheel discs are attached to the hubs and support rims that in turn carry the tires in a know manner. The discs, rims and tires are not shown in FIGS. 3–6.

The wheel hubs are each mounted on a two piece inner element 60 which comprises a pinion gear sleeve 62 and a key sleeve 64. When the two sleeves are put together surrounding the axle 52 they form an inner cylindrical surface 66 that engages the surface of the axle 42. The two piece inner element has a large diameter center portion 68 and two tapered portions extending therefrom, an axially inward tapered portion 70 and an axially outward tapered portion 72.

The wheel hubs each have a two tiered tapered interior bore with a small diameter first tapered portion 74 and a large diameter second tapered portion 76. The first tapered portion complements and fits onto the axially outward tapered portion 72 of the inner element 60. The large diameter second tapered portion 76 is radially spaced outward from the axially inward tapered portion 70 of the inner element 60. A split ring wedge 78 has a radially inner tapered portion 80 and a radially outer tapered portion 82. The inner tapered portion 80 complements and engages the axially inward tapered portion 70 of the inner element while the outer tapered portion 82 engages the large diameter second tapered portion 76 of the wheel hub. The wheel hub has a plurality of through bores 84 arranged in a circular pattern. The through bores 84 align with threaded holes 86 in the split ring wedge 78. Bolts 88 extend through the holes 84 in the hub and into the threaded holes 86 of the split ring wedge. As the bolts 88 are tightened, the split ring wedge and the wheel hub force the inner element against the axle 42, clamping the inner element thereto.

Figure 1:
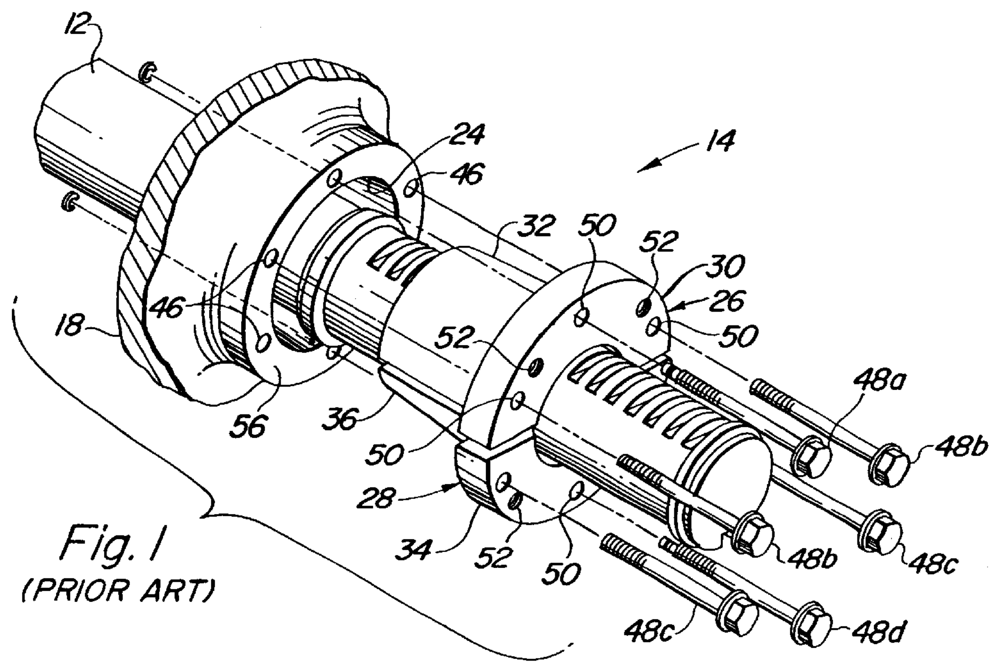
FIG. 1 is a respective view of a prior art adjustable wheel and axle assembly.

The angle of the tapered portions of the inner element, the split ring wedge and the wheel hub is at least 14 degrees, and preferably in the range between 14 and 16 degrees. With this taper angle, the components are self releasing and do not need bolts to push the split ring wedge away from the hub when the bolts 88 are released. As a result, there is additional space in the hub and split ring wedge to allow for twelve bolts 88. The increase in the number of bolts 88 increases the clamping load on the axle 42 compared to the design shown in FIG. 1.

The axle 42 is provided along a lengthwise portion of the periphery with axially spaced teeth 90, forming a rack. The pinion gear sleeve 62 is formed with a pocket 92 on the exterior surface thereof that receives a pinion gear 94. The pinion gear 94 is integrally formed with a shaft 96 that extends outward along the axis of the gear 94 and terminates in a distal end 100. The shaft 96 also extends beyond the pinion gear in the opposite direction as shown at 98. The distal end 100 of the shaft has an hexagon exterior shape to fit within a standard wrench socket. Furthermore, the end 100 has a square shaped recess (not shown) to alternatively receive the drive end of a wrench. By rotating the shaft 96, the inner element and wheel hub can be moved along the axle 42 to the desired location when the bolts 88 are loosened. This enables infinite adjustment of the wheel position along the axle 42. Both the inner and outer dual wheels can be equipped with the pinion gears 94, only the inner wheel hub is shown with the gear 94.

Adjustment of the wheel position is accomplished with the rack on the axle 42 facing upward as shown in the Figures. A yoke 102 fits over the pinion gear 94 and engages the shaft 96 on both sides of the pinion gear. The yoke has an upper surface 104 that engages the surfaces 106 of a pocket 108 in the split ring wedge 78, shown in FIG. 5. Furthermore, the yoke surface 104 engages the surfaces 110 of a similar pocket 112 in the wheel hub. With the bolts 88 loosened, the wheel hub rests on the yoke and pushes the pinion gear 94 into firm engagement with the teeth 90 of the axle. When the bolts 88 are tightened, the wheel hub is centered on the split ring wedge and inner element 60. This slightly lifts the hub off the yoke 104 to remove the weight of the wheel from the pinion gear 94. The shaft 96 extends outward through an opening 114 in the wheel hub. The split ring wedge has a groove 115 through which the shaft 96 also extends.

The key sleeve 64 of the inner element has an inwardly projecting key 116 that is seated into a key groove 118 (FIG. 3) in the axle 42. The key 116 prevents slippage of the inner element about the axle 42. Likewise, the exterior surface of a key sleeve 64 includes an outwardly projecting key 120 that seats in a notch 122 in the wheel hub and in a notch 124 in the split ring wedge. This prevents slippage of the wheel hub relative to the inner element.

The use of a dual tapered inner element, together with a split ring tapered wedge permits use of a larger taper angle that is self releasing. This in turn enables additional clamping bolts 88 to be used, increasing the clamping force on the axle 42 to accommodate higher levels of torque delivered to the wheels.

Having described the preferred embodiment, it will become apparent that various modifications can be made without departing from the scope of the invention as defined in the accompanying claims.

We claim:

1. An adjustable wheel and axle assembly for a work vehicle comprising:

an elongated axle;

a two piece inner element surrounding the axle and including an axial tubular portion having an inner cylindrical surface axially slidably fitting the axle and an outer double tapered portion having a large center portion and inner and outer tapered portions extending axially inward and axially outward respectively from the center portion;

a wheel hub encircling the axle and inner element, the hub having a two-tiered tapered interior bore with a small diameter first tapered portion complementing and fitting onto one of the inner and outer tapered portions of the inner element and a large diameter second tapered portion that is tapered in the same direction as the small diameter first tapered portion and is radially spaced outward from the other of the inner and outer tapered portions;

a split ring wedge having a radially inner tapered portion complementing and fitting onto the other of the inner and outer tapered portions and a radially outer tapered portion complementing and fitting into the large diameter second tapered portion of the wheel hub; and the wheel hub and the split ring wedge having aligned axially extending bores, the bores in one of the wheel hub and the split ring wedge being threaded to receive bolts to draw the split ring wedge toward the wheel hub whereby the tapered portions of the wheel hub, split ring wedge and inner element urge the inner element into tight engagement with the axle.

2. The adjustable wheel and axle assembly as defined in claim 1 wherein the angle of the tapered portions of the wheel hub, split ring wedge and inner element is at least 14 degrees.

3. The adjustable wheel and axle assembly as defined in claim 1 wherein the angle of the tapered portions of the wheel hub, split ring wedge and inner element is between 14 and 16 degrees.

4. The adjustable wheel and axle assembly as defined in claim 1 wherein the axle is provided along a lengthwise portion of the periphery with axially spaced teeth forming a rack and further comprising a pinion gear meshing with the rack and having an integral shaft extending outward along a pinion gear axis to a distal end adapted to be coupled to a tool to rotate the shaft and pinion gear, the pinion gear is disposed within a pocket formed in a pinion gear sleeve that comprises one of the two pieces of the two piece inner element with the shaft extending from the pocket through an opening in the wheel hub.

5. The adjustable wheel and axle assembly as defined in claim 4 further comprising a yoke extending over a radially outer portion of the pinion gear and engaging the integral shaft on each side of the pinion gear, the yoke having an outer surface upon which the wheel hub and split ring wedge rests when the axle is positioned with the rack facing upward and the bolts are released whereby the tapered portions are not urging the inner element into tight engagement with the axle whereby the weight of the wheel hub on the yoke presses the pinion gear against the rack.

6. The adjustable wheel and axle assembly as defined in claim 1 wherein one piece of the two piece inner element, a key sleeve, has a key in the inner surface thereof mating with a key groove in the axle.

7. The adjustable wheel and axle assembly as defined in claim 6 further comprising an outer key formed in the key sleeve disposed in a notch in the wheel hub and the split ring wedge.

* * * * *